Patented Aug. 7, 1951

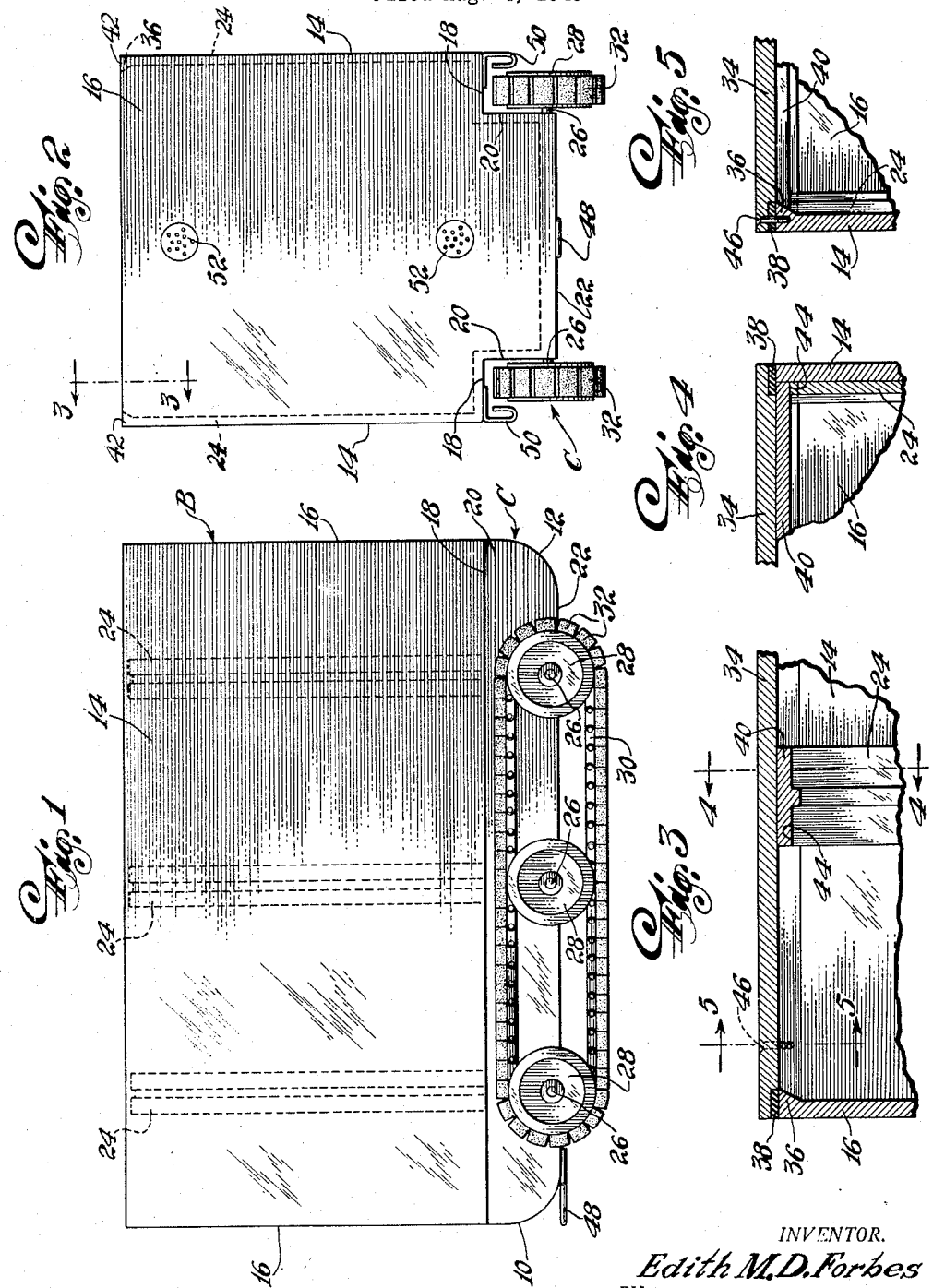

2,563,108

UNITED STATES PATENT OFFICE 2,563,108

COMBINATION CONTAINER AND VEHICLE

Edith Mary Downey Forbes, Union City, N. J.

Application August 4, 1948, Serial No. 42,412

1 Claim. (Cl. 280—50)

This invention relates to a container for transporting goods.

The primary object of my invention is to provide a container which holds goods during transportation and at the same time serves as a vehicle or means of conveyance on land as well as water.

One object of my present invention is to provide a combination container and vehicle of the character referred to which will pass over uneven surfaces or obstacles as are found, for instance, in a ship hold and on docks, and which will prove particularly useful in places where heavy lifting facilities are unavailable. Generally speaking, my combination container and vehicle does away with many disadvantages due to frequent loading and unloading of the same cargo.

The invention aims at a carrier for any kind of goods, including liquid and refrigerated cargo, the carrier being primarily intended for heavy loads (up to 30 tons and over).

Another object is to provide a container which is shaped so as to take up as little room as possible.

An important object of my invention is to provide a container of this class which is of sturdy construction.

Still another object of my invention is to provide containers which are shaped so as to permit easy placing one upon, or alongside, another for convenient transportation or storage.

Further objects of this invention will become clear from the following.

The specification is accompanied by a drawing in which:

Fig. 1 is a side view of an embodiment of a container for transporting goods embodying features of my invention, the cover of the container being omitted;

Fig. 2 is a front view of same;

Fig. 3 is a fragmentary section taken in elevation, but illustrating the container of Figs. 1 and 2 in closed position, drawn to enlarged scale;

Fig. 4 is a fragmentary section taken approximately in the plane of the line 4—4 of Fig. 3; and Fig. 5 is a fragmentary section taken approximately in the plane of the line 5—5 of Fig. 3.

Referring to the drawing and more particularly to Figs. 1 and 2, a container for transporting goods generally designated C comprises a body generally designated B. The body is made from heavy metal and has substantially the form of a prism, the front edge at 10 and the rear edge at 12 being preferably rounded to minimize resistance and wear during transportation. The body comprises four side walls 14 and 16, respectively, inwardly bent portions 18, combination side walls 20, and a bottom wall 22. In the form selected for illustration, the two side walls proper, 14, are of identical rectangular shape, the front and rear walls 16 are of a different, but again identical, rectangular shape. The bent portions 18 are perpendicular to the side walls 14 and to the so-called continuation side walls 20, the latter being, therefore, parallel to the walls 14.

The body B is reinforced by a frame consisting of a number of riblike members 24 running in planes parallel to the walls 16 completely around the body. From Fig. 2 it will be clearly seen that the members 24, for reliable reinforcement purposes, follow the cross sectional shape of the body. The members 24 are united with the body, preferably by welding. Mounted for rotation on the ends of axles 26 are wheels 28, and trained over the wheels on each side of the container is an endless flexible belt 30. Treads 32 of suitable material are spacedly attached to the belts 30.

In accordance with my invention, the wheels 28 are within the planes of the walls 14. The spaces for the wheels, according to another feature of my invention, being partly defined by the walls formed by the shown offset in the side walls 14, it will be clear that the greater portions of the wheels will be located within the spaces defined by the planes of the bent portions 18, continuation side walls 20, bottom wall 22, and side walls 14.

Having reference now to Figs. 3 to 5, the cover 34 is shaped to close the open top of the body. The side walls 14 and 16 have thickened peripheral portions 36 (see Figs. 3 and 5), which may be formed by an outwardly turned flange or bead, said portions extending all around the body and forming a seat for a gasket 38. The cover lies against the gasket. From inspection of Figs. 3 and 4, it will be seen that there are members 40 which rest on the side walls and extend between the ends 42 of the members 24 (see Fig. 2), thus completing the structural reinforcing frame of the container body. While the members 24 are permanently united with the body, the members 40 are removable to allow long packages to be loaded.

Both the members 24 and 40 are preferably T-shaped steel beams. As can be seen from Fig. 3, there are cutouts 44 in the side walls 14 to receive the ends of the members 40.

In the closed condition of my container, the cover 34 is tightly screwed against the body by means of countersunk bolts 46. It will be clear that my container when closed may be used for carrying liquid cargo and may also serve as an amphibious craft.

Reverting to Fig. 2, a loop 48 serves for connecting the container with an automotive vehicle to haul the container. Clips 50 are provided for hoisting the container if desired. Flanges 52 close openings in one or more of the side walls, such openings being provided for loading and discharging of bulk or liquid cargo and being also used as air vents. Interchangeable connections may be provided to use the connection required in a given instance.

It will be noted that the container as illustrated has substantially even surfaces with no projections, making it possible to be easily drawn on snowy roads and through water, and to be placed one closely alongside another.

Attention is again called to the important features of my invention according to which the wheels 28 are mounted so as to be within the planes of the side walls 14, the greater portions of the wheels being thereby located within the spaces defined by the planes of the bent portions 18, continuation walls 20, bottom wall 22, and side walls 14. The latter feature results in a container the bottom of which is relatively close to the ground. Thus, regarding the space-saving factor, my combination container and vehicle does not take up more space than is needed by the container proper.

My container is shaped so as to permit not only stowing of containers immediately next to the other, but also stacking any number of rows upon each other.

From the foregoing detailed description, it will also be clear that my combination container and vehicle does away with uneconomical handling of cargo. Where previously unloading and reloading had to be done twice or more times, my invention makes it possible to do it just once. My container carries the cargo to the place where otherwise unloading and reloading was done, makes a journey by boat, railroad or plane, is unloaded itself, thereby again saving the procedure of unloading and reloading the cargo, and finally continues the jouney to the place of destination.

The container according to my invention may have shapes other than that shown in order to accommodate it to certain circumstances.

It is believed that the construction and operation, as well as the many advantages of my novel combination container and vehicle, will be apparent from the foregoing detailed description thereof. It will also be apparent that while I have shown and described my invention in a preferred form, many changes and modifications may be made in the structure disclosed, without departing from the spirit of the invention as sought to be defined in the following claim.

Having described the invention, I claim as new:

Container for transporting goods, comprising a body having an open top, a closure for the opening, wheels, and an endless belt trained over the wheels, said body including two parallel vertical side walls offset near their bottoms, two bends inwardly directed from said side walls, two continuation side walls extending parallel to said vertical side walls, a bottom wall, a frame consisting of riblike members running from top to top around said body, and members removably resting on the ends of said riblike members and adapted to support said closure, the latter members completing the frame structure in the closed condition of the container, said wheels being mounted so as to be within the planes of said vertical side walls.

EDITH MARY DOWNEY FORBES.

REFERENCES CITED

The following references are of record in the file of this patent:

UNITED STATES PATENTS

| Number | Name | Date |
| --- | --- | --- |
| 548,397 | Shadbolt | Oct. 22, 1895 |
| 569,520 | Russell | Oct. 13, 1896 |
| 580,945 | Leonhardt | Apr. 20, 1897 |
| 2,033,192 | Ellis | Mar. 10, 1936 |
| 2,422,254 | Peronti | June 17, 1947 |
| 2,442,334 | Bailey | June 1, 1948 |